United States Patent
Svensson et al.

(10) Patent No.: US 11,904,856 B2
(45) Date of Patent: Feb. 20, 2024

(54) DETECTION OF A REARWARD APPROACHING EMERGENCY VEHICLE

(71) Applicant: Zenuity AB, Gothenburg (SE)

(72) Inventors: Daniel Svensson, Gothenburg (SE); Joakim Bjärmark, Torslanda (SE); Malin Lundgren, Gothenburg (SE)

(73) Assignee: Zenuity AB, Gothenburg (SE)

( * ) Notice: Subject to any disclaimer, the term of this patent is extended or adjusted under 35 U.S.C. 154(b) by 368 days.

(21) Appl. No.: 17/193,325

(22) Filed: Mar. 5, 2021

(65) Prior Publication Data

US 2021/0323546 A1 Oct. 21, 2021

(30) Foreign Application Priority Data

Apr. 15, 2020 (EP) .................................... 20169636

(51) Int. Cl.
*B60W 30/095* (2012.01)
*B60W 30/09* (2012.01)
*G08G 1/0965* (2006.01)

(52) U.S. Cl.
CPC ........ *B60W 30/0956* (2013.01); *B60W 30/09* (2013.01); *G08G 1/0965* (2013.01);
(Continued)

(58) Field of Classification Search
CPC ............. B60W 30/0956; B60W 30/09; B60W 2554/4041; B60W 2554/802; B60W 2554/4046; G08G 1/0965
See application file for complete search history.

(56) References Cited

U.S. PATENT DOCUMENTS

2017/0297576 A1* 10/2017 Halder ............. G08G 1/096844
2018/0137756 A1 5/2018 Moosaei et al.
(Continued)

FOREIGN PATENT DOCUMENTS

DE 102018118760 A1 2/2020
EP 2620929 A1 7/2013

OTHER PUBLICATIONS

European Search Report dated Oct. 9, 2020 for International Application No. 20169636.6 filed on Apr. 15, 2020, consisting of 8-pages.

*Primary Examiner* — Behrang Badii
*Assistant Examiner* — Jay Khandpur
(74) *Attorney, Agent, or Firm* — Christopher & Weisberg, P.A.

(57) ABSTRACT

A method performed by a behavioral analyzing system for detection of an emergency vehicle approaching a vehicle from behind. The system derives a road configuration of a road along which the vehicle, based on ego-vehicle position obtained with support from localization sensors on-board the vehicle, is or was positioned. The system further determines unconventional driving criteria in view of the road configuration. The system determines based on surrounding vehicle detection data of a first and at least a second surrounding vehicle, obtained with support from surrounding detecting sensors on-board the vehicle, a respective first and at least a second surrounding vehicle trajectory along at least the road section. The system determines, when the first and the at least second surrounding vehicle trajectory fulfill at least a portion of the unconventional driving criteria, that an emergency vehicle is deemed to be approaching the vehicle from behind.

20 Claims, 4 Drawing Sheets

(52) U.S. Cl.
CPC ............ *B60W 2554/4041* (2020.02); *B60W 2554/4046* (2020.02); *B60W 2554/802* (2020.02)

(56) References Cited

U.S. PATENT DOCUMENTS

| | | |
|---|---|---|
| 2018/0297593 A1 | 10/2018 | Pitale et al. |
| 2018/0374347 A1* | 12/2018 | Silver .................. G08G 1/0965 |
| 2019/0359214 A1* | 11/2019 | Max ........................ G06V 20/58 |
| 2021/0146922 A1* | 5/2021 | Fuchs ............... B60W 30/0956 |
| 2021/0241624 A1* | 8/2021 | Kan ........................ G07C 5/085 |
| 2021/0293572 A1* | 9/2021 | Konrardy ................ G06F 21/32 |

\* cited by examiner

DETECTION OF A REARWARD APPROACHING EMERGENCY VEHICLE

CROSS-REFERENCE TO RELATED APPLICATION

This application is related to and claims priority to European Patent Application No. 20169636.6, filed Apr. 15, 2020, the entirety of which is incorporated herein by reference.

TECHNICAL FIELD

The present disclosure relates to detection of an emergency vehicle approaching a vehicle from behind.

BACKGROUND

An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. To function as intended, ADAS may rely on inputs from multiple data sources, such as one or more of e.g. image sensor, camera, ultrasonics, lidar, radar, image processing, and/or computer vision.

Moreover, in a not too distant future, autonomous or automated driving systems—commonly referred to as AD systems—will to greater extent find their way into modern vehicles. An AD system is a complex combination of various components that can be defined as a system where perception, decision making, and operation of the vehicle are performed by electronics and machinery instead of a human driver. This includes handling of the vehicle as well as awareness of its surroundings. While the automated system has control over the vehicle, it allows the human operator to leave all responsibilities to the system. An AD system commonly combines a variety of sensors to perceive the vehicle's surroundings, such as e.g. radar, lidar, ultrasonics, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Just as vehicle drivers, vehicles equipped with ADAS and/or AD systems must act according to traffic regulations. One such regulation may be the obligation to make way for emergency vehicles approaching from behind, by e.g. moving partially or completely out of the lane, and possibly also the road, in order to leave sufficient room for the emergency vehicle to be able to pass.

Detection of a rearward approaching emergency vehicle may, however, prove to be difficult, not the least in e.g. dense and/or slightly congested traffic where there may be a number of vehicles on the road behind the ego-vehicle. Proposed approaches for emergency vehicle detection include emergency light detection in rearward-facing cameras, and/or sound analysis of external microphones in order to perceive that there is an emergency vehicle approaching. A drawback of the first approach is that detection may occur rather late, due to occlusion by other vehicles. In addition, blinking light detection is a non-trivial problem, especially so when the color of the light is of importance. Furthermore, different countries may have different color schemes for emergency vehicles, which may give rise to added complexity. When it comes to the microphone approach, there are several complications, ranging from the difficulty of mounting such sensors, the high noise level at higher speeds, and the unlikeliness of such sensors being part of a high-volume vehicle series in a foreseeable future.

SUMMARY OF THE INVENTION

It is therefore an object of embodiments herein to provide an approach for in an improved and/or alternative manner determine that an emergency vehicle is potentially approaching a vehicle from behind.

The object above may be achieved by the subject-matter disclosed herein. Embodiments are set forth in the appended claims, in the following description and in the drawings.

The disclosed subject-matter relates to a method performed by a behavioral analyzing system for detection of an emergency vehicle approaching a vehicle from behind. The behavioral analyzing system derives from a digital map a road configuration of a road along which the vehicle, based on ego-vehicle positions obtained with support from localization sensors on-board the vehicle, is determined to be—and/or have been—positioned. The behavioral analyzing system further determines unconventional driving criteria in view of the road configuration. Moreover, the behavioral analyzing system determines based on surrounding vehicle detection data of a first and at least a second surrounding vehicle, obtained with support from surrounding detecting sensors on-board the vehicle, derived continuously and/or intermittently along at least a road section of the road, a respective first and at least a second surrounding vehicle trajectory along at least the road section in view of the digital map. The behavioral analyzing system further determines, when the first and the at least second surrounding vehicle trajectory respectively and/or combined fulfill at least a portion of the unconventional driving criteria, that an emergency vehicle is deemed to be approaching the vehicle from behind.

The disclosed subject-matter further relates to a behavioral analyzing system for—and/or adapted for—detection of an emergency vehicle approaching a vehicle from behind. The behavioral analyzing system comprises a road configuration deriving unit for—and/or adapted for—deriving from a digital map a road configuration of a road along which the vehicle, based on ego-vehicle positions obtained with support from localization sensors on-board the vehicle, is determined to be—and/or have been—positioned. The behavioral analyzing system further comprises a criterion determining unit for—and/or adapted for—determining unconventional driving criteria in view of the road configuration. Moreover, the behavioral analyzing system comprises a trajectory determining unit for—and/or adapted for—determining based on surrounding vehicle detection data of a first and at least a second surrounding vehicle, obtained with support from surrounding detecting sensors on-board the vehicle, derived continuously and/or intermittently along at least a road section of the road, a respective first and at least a second surrounding vehicle trajectory along at least the road section in view of the digital map. The behavioral analyzing system furthermore comprises a criterion fulfillment determining unit for—and/or adapted for—determining, when the first and the at least second surrounding vehicle trajectory respectively and/or combined fulfill at least a portion of the unconventional driving criteria, that an emergency vehicle is deemed to be approaching the vehicle from behind.

Furthermore, the disclosed subject-matter relates to a vehicle and/or an off-board entity comprising a behavioral analyzing system as described herein.

Moreover, the disclosed subject-matter relates to a computer program product comprising a computer program containing computer program code means arranged to cause a computer or a processor to execute the steps of the behavioral analyzing system described herein, stored on a computer-readable medium or a carrier wave.

The disclosed subject-matter further relates to a non-volatile computer readable storage medium having stored thereon said computer program product.

Thereby, there is introduced an approach according to which behavioral analysis of surrounding vehicles form basis for determining presence of a rearward approaching emergency vehicle. That is, since there is derived from a digital map a road configuration of a road along which the vehicle, based on ego-vehicle positions obtained with support from localization sensors on-board the vehicle, is determined to be—and/or have been—positioned, it may be determined with support from on-board localization sensors adapted to obtain one or more positions of the vehicle, which road the vehicle currently is—and/or recently have been—positioned at and/or along, whereby road characteristics of that road may be derived from a digital map covering and comprising information relating to said road. Accordingly, the behavioral analyzing system may be made aware of road characteristics of said road, e.g. relating to road markings, lane markings, shoulders, roadsides etc. Moreover, that is, since there are determined unconventional driving criteria in view of the road configuration, it is established one or more criteria for what may be considered unusual vehicle driving and/or positioning when taking into consideration the characteristics of the road, such as e.g. crossing of a road marking, driving out on a shoulder and/or roadside, etc. Furthermore, that is, since there is determined based on surrounding vehicle detection data of a first and at least a second surrounding vehicle, obtained with support from surrounding detecting sensors on-board the vehicle, derived continuously and/or intermittently along at least a road section of the road, a respective first and at least a second surrounding vehicle trajectory along at least the road section in view of the digital map, driving paths of two or more surrounding vehicles are, with support from on-board surrounding detecting sensors adapted to repeatedly—during a period of time—capture surrounding vehicles positioned essentially behind the ego-vehicle, determined along at least a stretch of the digital map road. Accordingly, the behavioral analyzing system tracks how surrounding vehicles are—and/or have been—driving along the road, and maps this to the digital map. Moreover, that is, since there is determined—when the first and the at least second surrounding vehicle trajectory respectively and/or combined fulfill at least a portion of the unconventional driving criteria—that an emergency vehicle is deemed to be approaching the vehicle from behind, the behavioral analyzing system may—by in view of unconventional driving criteria applicable for the road configuration of the road which the vehicle has been established to be or recently have been positioned, assessing trajectories of surrounding vehicles positioned essentially behind the vehicle—should said respective trajectory and/or said trajectories in combination with one another fulfill one or more criterion out of said unconventional driving criteria—establish a presence of a rearward approaching emergency vehicle. That is, with the introduced concept, by behavioral analysis of the determined digital map driving trails of the surrounding vehicles in comparison to unconventional driving criteria such as e.g. relating to crossing or nearly crossing of e.g. road marking—which may translate into one or more of the surrounding vehicles maneuvering out of the way—a potential emergence from behind of an emergency vehicle, may be detected.

For that reason, an approach is provided for in an improved and/or alternative manner determine that an emergency vehicle is potentially approaching a vehicle from behind.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to detection of an emergency vehicle approaching a vehicle from behind, there will be disclosed an approach according to which behavioral analysis of surrounding vehicles form basis for determining presence of a rearward approaching emergency vehicle.

Figure 1A:
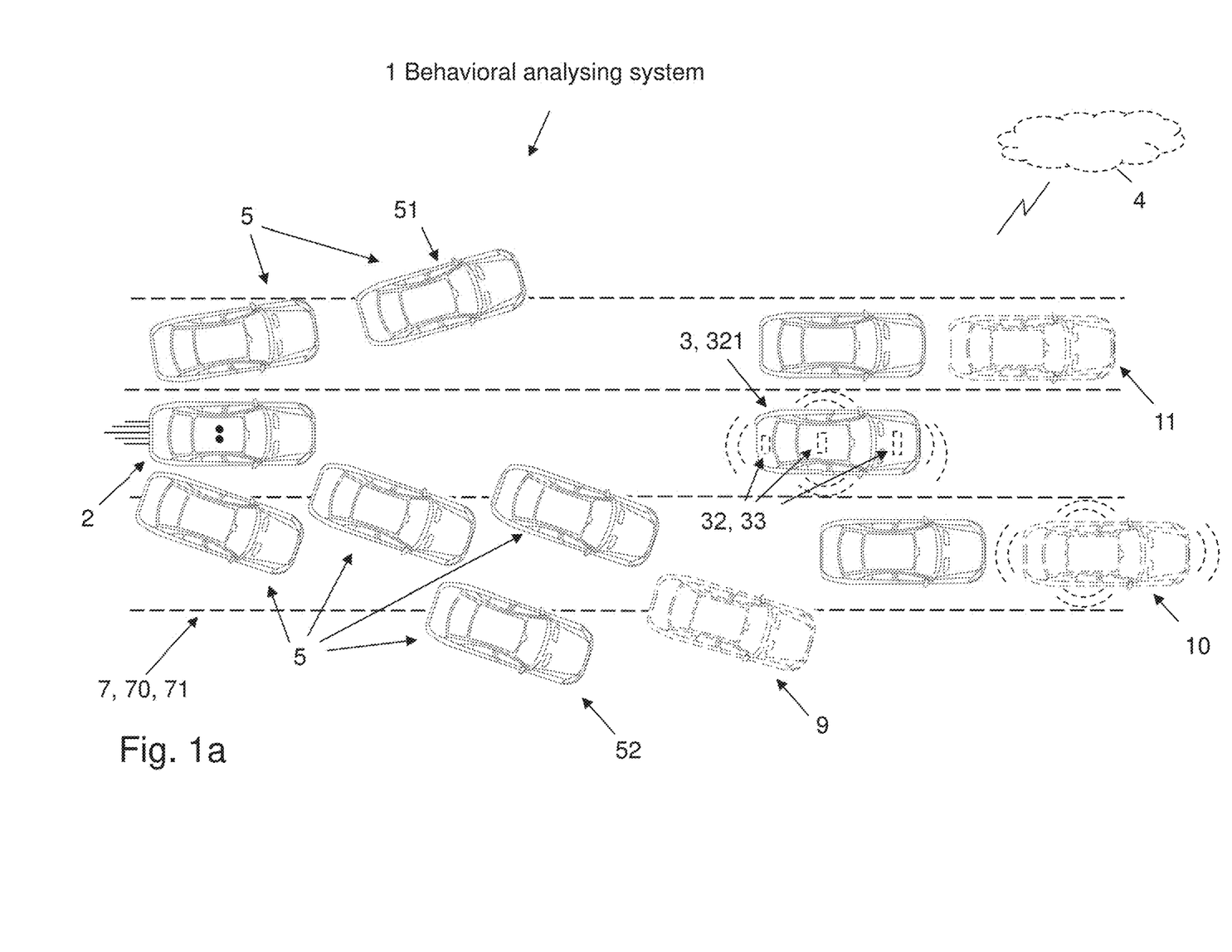
FIGS. 1a-b illustrate schematic views of an exemplifying behavioral analyzing system according to embodiments of the disclosure.
Figure 1B:
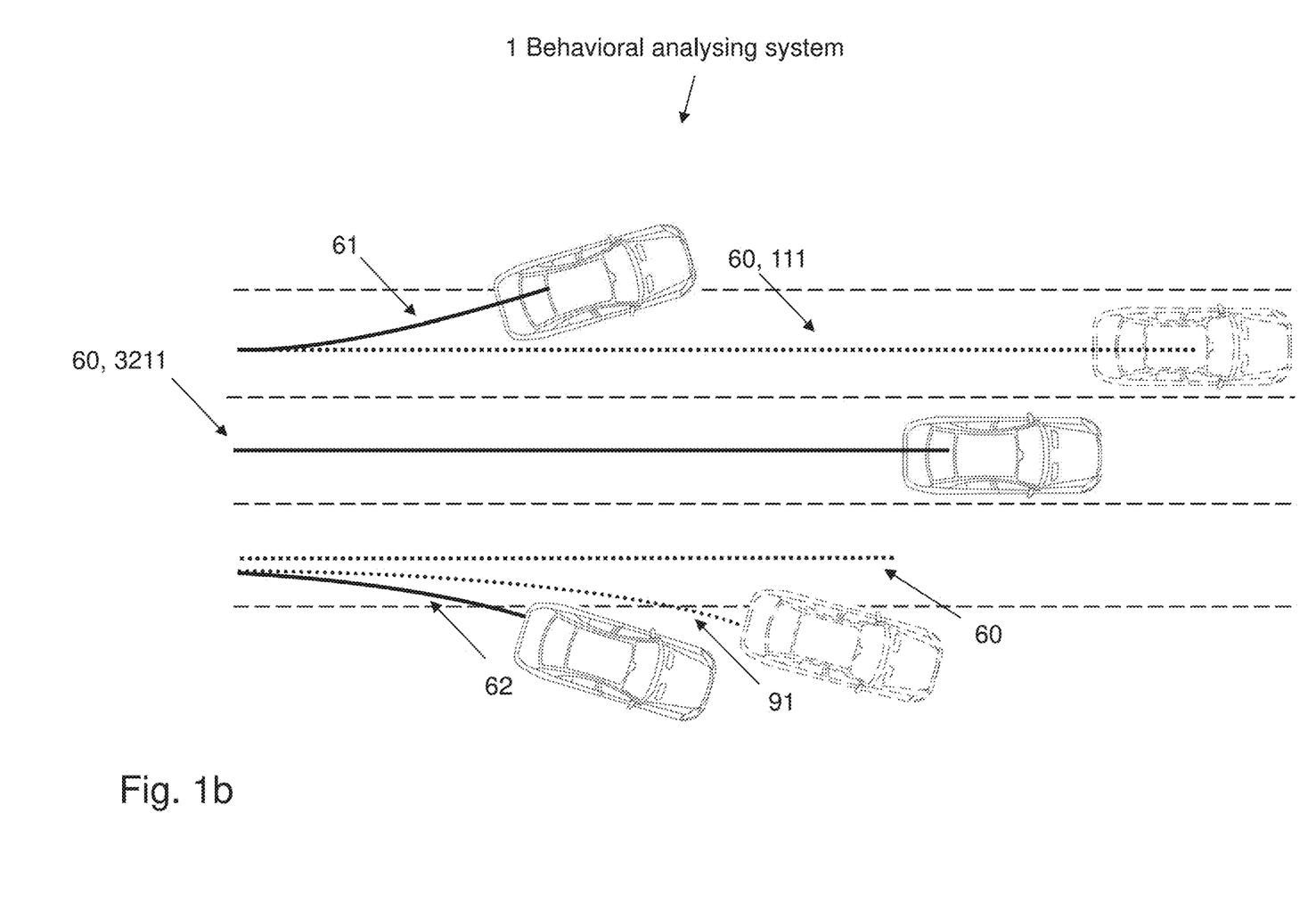
Figure 2:
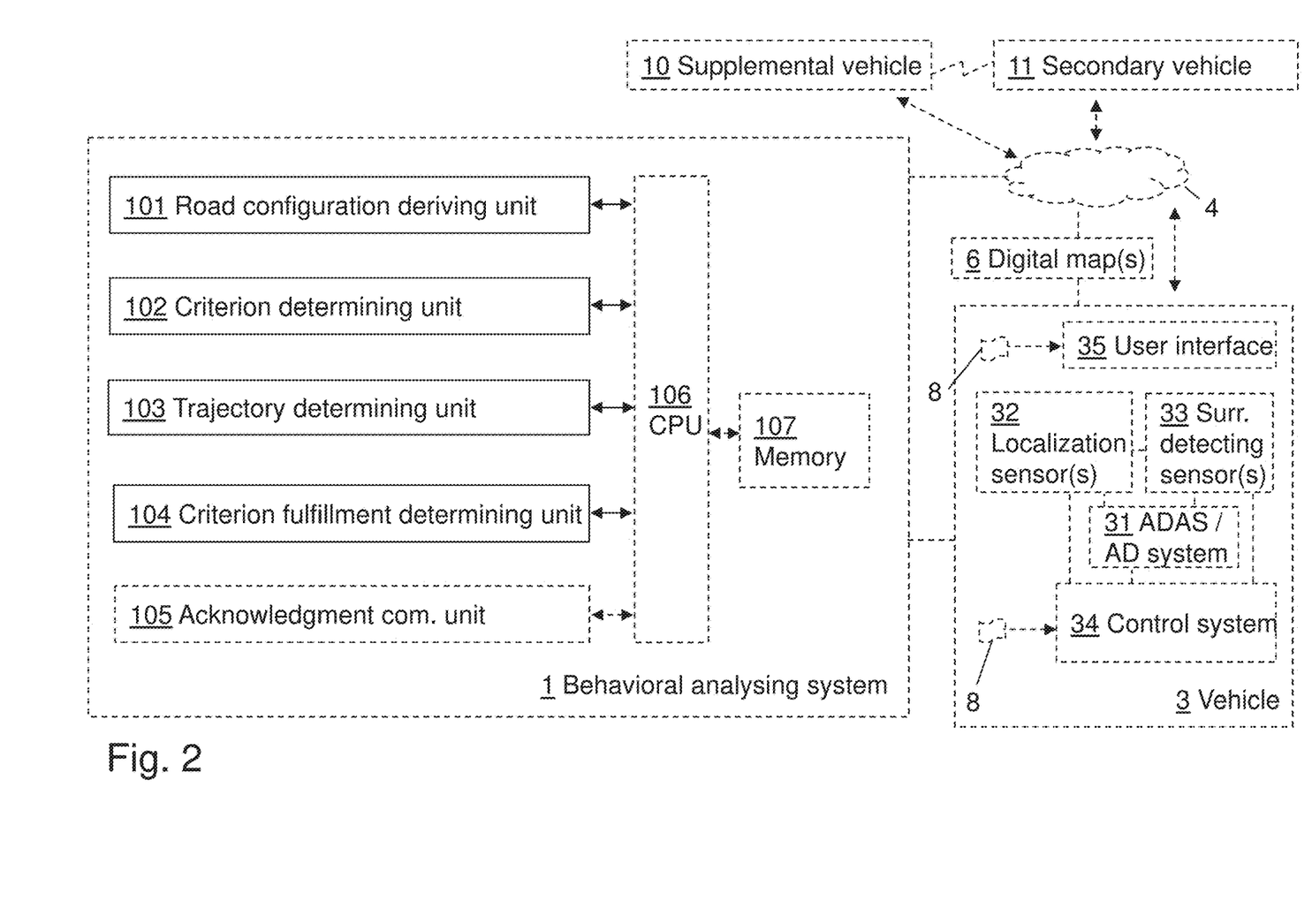
FIG. 2 is a schematic block diagram illustrating an exemplifying behavioral analyzing system according to embodiments of the disclosure.

Referring now to the figures and FIGS. 1a-b and FIG. 2 in particular, there are depicted respectively schematic views and a schematic block diagram of an exemplifying behavioral analyzing system 1 according to embodiments of the disclosure. The behavioral analyzing system 1 is for detection of an emergency vehicle 2 approaching a vehicle 3 from behind. Although the emergency vehicle 2 may be positioned any arbitrary distance behind the vehicle 3, in FIG. 1, for illustrative purposes, the emergency vehicle 2 is depicted within rearward view of the vehicle 3.

The behavioral analyzing system 1 may at least partly be comprised in the vehicle 3. Additionally or alternatively, the behavioral analyzing system 1 may at least partly be comprised in an off-board entity 4. The off-board entity 4—which is "off-board" in view of the vehicle 3—may refer to any entity—e.g. known—adapted and/or configured for off-board and/or offline processing and/or analysis, such as e.g. a cloud and/or automotive cloud, cloud network adapted for cloud-based storage, back-end system, and/or one or more servers. Consequently, the behavioral analyzing system 1 may accordingly be either comprised on-board the vehicle 3, or alternatively, be at least partially comprised in the off-board entity 4.

The phrase "behavioral analyzing system" may refer to "surrounding vehicles analyzing system", whereas "for detection of an emergency vehicle approaching" may refer to "for anticipating an emergency vehicle approaching", "for detection of the event that an emergency vehicle approaching", "for determining presence of an emergency vehicle approaching", "for determining potential presence of an emergency vehicle approaching", "for determining that an emergency vehicle is deemed to be approaching" and/or "for apprehension of an emergency vehicle approaching". The phrase "approaching a vehicle from behind", on the other hand, may refer to "approaching a vehicle from behind, within a predeterminable distance from said vehicle". Such an optional predeterminable distance may be of any arbitrary distance, e.g. up to 500 meters or even 3000 meters. According to an example, the phrase "behavioral analyzing system for detection of an emergency vehicle approaching a vehicle from behind" may refer to "behavioral analyzing system of a vehicle for detection of a rearward approaching emergency vehicle".

The term "vehicle" in general may refer to any arbitrary manned or unmanned vehicle, for instance an engine-propelled or electrically-powered vehicle such as a car, truck, lorry, van, bus, motorcycle and/or tractor. Moreover, the emergency vehicle 2—which for instance may be represented by an ambulance, police vehicle, fire truck, etc.—may refer to any arbitrary—e.g. known—vehicle designated and authorized to respond to an emergency such as in a life-threatening situation. The exemplifying vehicle designated "3", on the other hand, which may be referred to as the ego-vehicle, may refer to "autonomous and/or at least partly autonomous vehicle", "driverless and/or at least partly driverless vehicle", "automated and/or at least partly automated vehicle" and/or "self-driving and/or at least partly self-driving vehicle". The vehicle 3 may thus comprise, and/or be adapted to support an ADAS and/or AD system 31, i.e. an advanced driver-assistance system and/or an automated driving system. Such an exemplifying ADAS and/or AD system 31 may refer to any arbitrary ADAS and/or AD system, e.g. known in the art and/or yet to be developed.

The vehicle 3 and/or the optional ADAS or AD system 31 may accordingly comprise, be provided with and/or have on-board an optional perception system (not shown) adapted to estimate surroundings of the vehicle 3, and subsequently adapted to estimate world views of the surroundings e.g. with support from a commonly known digital map such as a high definition, HD, map. Such an exemplifying perception system may refer to any commonly known system and/or functionality, e.g. comprised in one or more electronic control modules, ECUs, and/or nodes of the vehicle 3 and/or the ADAS or AD system 31, adapted and/or configured to interpret sensory information—relevant for driving of the vehicle 3—to identify e.g. obstacles, vehicle lanes, relevant signage, appropriate navigation paths etc. The exemplifying perception system—which may be adapted to support e.g. sensor fusion, tracking, localization etc.—may thus be adapted to rely on sensory information. Such exemplifying sensory information may for instance be derived from one or more localization sensors 32 and/or surrounding detecting sensors 33 comprised in and/or provided on-board the vehicle 3. The localization sensors 32 and/or surrounding detecting sensors 33 may be represented by any arbitrary sensors adapted to sense and/or perceive the vehicle's 3 whereabouts and/or surroundings, and may e.g. refer to one or a combination of one or more of a navigation or positioning system e.g. GNSS such as GPS, odometer, inertial measurement units, radar, lidar, ultrasonics and/or camera. It may be noted that the localization sensors 32 and the surrounding detecting sensors 33—at least to some extent—may refer to the same and/or similar sensors.

Further depicted in FIG. 1, driving essentially behind the vehicle 3, is an arbitrary number of surrounding vehicles 5, which may be represented by any arbitrary vehicles.

The behavioral analyzing system 1 is—e.g. by means of a road configuration deriving unit 101—adapted and/or configured for deriving from a digital map 6 a road configuration 70 of a road 7 along which the vehicle 3, based on ego-vehicle positions 321 obtained with support from localization sensors 32 on-board the vehicle 3, is determined to be—and/or have been—positioned. Thereby, with support from one or more on-board localization sensors 32 adapted to obtain one or more positions 321 of the vehicle 3, it may be determined which road 7 the vehicle 3 currently is—and/or recently have been—positioned at and/or along, whereby road characteristics 70 of that road 7 may be derived from a digital map 6 covering and comprising information relating to said road 7. Accordingly, the behavioral analyzing system 1 may be made aware of road characteristics 70 of said road 7, e.g. relating to road markings, lane markings, shoulders, roadsides etc.

The road configuration 70—which e.g. may be pre-stored in the digital map 6—may be derived from said map 6 in any arbitrary—e.g. known—feasible manner, and refer to any arbitrary characteristics of a road 7 e.g. relating to road markings, lane markings, road shoulders, roadsides etc. Although the road 7 depicted in exemplifying FIG. 1 is straight, the road 7 may be represented by any type road of arbitrary dimensions, curved and/or straight, and/or a combination thereof, wide or narrow, etc. Furthermore, the stretch of the road 7 covered by the road configuration 70 may be of any arbitrary length. Moreover, the digital map 6 may refer to any arbitrary—e.g. known—digital map, such as e.g. a high definition, HD, map or any equivalent and/or successor thereof. The digital map 6 may further refer to a map on-board the vehicle 3, or alternatively, two or more distributed maps, such as a first digital map located on-board the vehicle 3 and a second digital map located in the off-board entity 4 should the behavior analyzing system at least partly be comprised in said entity 4. The ego-vehicle positions 321, which may refer to one or more ego-vehicle positions, may be obtained—and/or have been obtained—in any arbitrary—e.g. known—manner, with support from the on-board localization sensors 32 discussed above.

The phrase "deriving from a digital map a road configuration" may refer to "deriving from one or more digital maps a road configuration", and further to "determining from a digital map a road configuration" and/or "deriving from a digital map a pre-stored road configuration". The phrase "road configuration", on the other hand, may refer to "road characteristics", whereas "digital map" may refer to "ego-vehicle digital map and/or off-board digital map". Moreover, "a road configuration of a road" may refer to "a road configuration of a predeterminable road" and/or "a road configuration of a portion and/or stretch of a road". The phrase "based on ego-vehicle positions obtained with support from localization sensors" may refer to "based on one or more ego-vehicle positions obtained with support from localization sensors", whereas "localization sensors", in a similar manner, may refer to "one or more localization sensors", and further to "positioning sensors and/or surrounding detecting sensors" and/or "a positioning system and/or surrounding detecting sensors". Moreover, "obtained with support from localization sensors" may refer to "derived with support from localization sensors", "obtained continuously and/or intermittently with support from localization sensors" and/or "obtained during a pre-determinable time period with support from localization sensors". The phrase "based on ego-vehicle positions", on the other hand, may—according to an example—refer to "based on ego-vehicle positions and orientations, poses" and/or "based on an ego-vehicle trajectory in view of a digital map". Moreover, the phrase "determined to be—and/or have been—positioned" may refer to "determined to be—and/or recently have been—positioned" and/or "determined to be—and/or within a predeterminable time frame have been—positioned". Such an optional time frame may range back in time any arbitrary amount of time deemed feasible for the implementation and/or situation at hand, such as for instance exemplifying 30 seconds. Moreover, according to an example, the phrase "determined to be—and/or have been—positioned" may refer to "determined to be—and/or have been—driving".

The behavioral analyzing system 1 is—e.g. by means of a criterion determining unit 102—adapted and/or configured for determining unconventional driving criteria in view of the road configuration 70. Thereby, it is established one or more criteria for what may be considered unusual vehicle driving and/or positioning when taking into consideration the characteristics 70 of the road 7, such as e.g. crossing of a road marking, driving out on a shoulder and/or roadside, etc.

The unconventional driving criteria, which may refer to one or more unconventional driving criteria, may be defined by any one or more arbitrary criteria deemed relevant for the implementation at hand in view of the road characteristics 70, such as e.g. a partial or complete vehicle crossing of a road marking, partial or complete vehicle driving out on a shoulder and/or roadside, etc. Furthermore, the unconventional driving criteria may stipulate quantity thresholds such as minimum number of vehicles involved in what is deemed unconventional driving, time frame thresholds such as restrictions relating to period of time when such unconventional driving may have taken place, and/or dependency thresholds such as criterion level(s) being dependent on whether other unconventional driving criteria and/or thresholds are being fulfilled. Moreover, the unconventional driving criteria may be predeterminable and/or adjustable. Additionally or alternatively, the unconventional driving criteria may be variable, such as for instance trainable, e.g. with support from a neural network.

The phrase "determining unconventional driving criteria" may refer to "storing unconventional driving criteria", whereas "unconventional driving criteria" may refer to "unconventional maneuver(s) criteria", "unusual driving criteria", "discrepancy exceedance criteria", "at least a first unconventional driving criterion", "one or more unconventional driving criteria", "unconventional driving thresholds" and/or "predeterminable and/or trainable unconventional driving criteria". The phrase "in view of said road configuration", on the other hand, may refer to "taking into consideration and/or account said road configuration" and/or "based on said road configuration".

The behavioral analyzing system 1 is—e.g. by means of a trajectory determining unit 103—adapted and/or configured for determining based on surrounding vehicle detection data of a first 51 and at least a second surrounding vehicle 52, obtained with support from surrounding detecting sensors 33 on-board the vehicle 3, derived continuously and/or intermittently along at least a road section 71 of the road 7, a respective first 61 and at least a second surrounding vehicle trajectory 62 along at least the road section 71 in view of the digital map 6. Thereby, with support from on-board surrounding detecting sensors 33 adapted to repeatedly—during a period of time—capture surrounding vehicles 5 positioned essentially behind the ego-vehicle 3, driving trails 61, 62 of two or more surrounding vehicles 51, 52 are determined along at least a stretch 71 of the digital map road 7. Accordingly, the behavioral analyzing system 1 tracks how surrounding vehicles 5 are—and/or have been—driving along the road 7, and maps this to the digital map 6.

The surrounding vehicle detection data may be captured—and/or have been captured—by the surrounding detecting sensors 33 discussed above, in any arbitrary—e.g. known—feasible manner. Moreover, the surrounding vehicle detection data may be captured—and/or have been captured—repeatedly at any arbitrary frequency feasible for the implementation and/or situation at hand, and further during an arbitrary—e.g. predeterminable—time period. Furthermore, the road section 71 may refer to any stretch of the road 7 of any arbitrary length. It may be noted that a road section 71 in view of the first surrounding vehicle trajectory 61 may differ from a road section 71 in view of the at least second surrounding vehicle trajectory 62, i.e. the respective road sections 71 for the different trajectories 61, 62 may refer to slightly different—or merely partly overlapping—stretches of the road 7.

It should further be understood that although in exemplifying FIG. 1, merely two surrounding vehicle trajectories 61, 62 have been depicted, any arbitrary feasible number of surrounding vehicle trajectories following upon any arbitrary number of surrounding vehicles 5, may be determined along the road section 71 in view of the digital map 6. Nonetheless, in exemplifying FIG. 1, the first surrounding vehicle trajectory 61 reveals that the first surrounding vehicle 51 in an exemplifying manner has crossed left-hand side road markings, whereas the second surrounding vehicle trajectory 62 reveals that the second surrounding vehicle 52 in an exemplifying manner has crossed right-hand side road markings.

The phrase "determining based on surrounding vehicle detection data" may refer to "storing based on surrounding vehicle detection data" and/or "mapping based on surrounding vehicle detection data". The phrase "surrounding vehicle detection data" may refer to "surrounding vehicle detection information" and/or merely "detection data", whereas "of a first and at least a second surrounding vehicle" may refer to "of two or more surrounding vehicles" and/or "of a first and at least a second surrounding vehicle positioned essentially behind said vehicle". The phrase "obtained with support from surrounding detecting sensors", on the other hand, may refer to "derived with support from surrounding detecting sensors" and/or "obtained with support from essentially rearward-capturing surrounding detecting sensors", whereas "derived continuously and/or intermittently" may refer to "fetched continuously and/or intermittently" and/or "derived continuously and/or intermittently during a predeterminable time period". Moreover, "along at least a road section of said road" may refer to "along at least a stretch of said road", whereas "a respective first and at least a second surrounding vehicle trajectory" may refer to "two or more surrounding vehicle trajectories", "a respective first and at least a second surrounding vehicle history trajectory" and/or "a respective first and at least a second surrounding vehicle driving path, trail and/or snail trail". Furthermore, the phrase "along at least said road section in view of said digital map" may refer to "along at least said road section in said digital map".

The behavioral analyzing system 1 is—e.g. by means of a criterion fulfillment determining unit 104—adapted and/or configured for determining, when the first 61 and the at least second surrounding vehicle trajectory 62 respectively and/or combined fulfill at least a portion of the unconventional driving criteria, that an emergency vehicle 2 is deemed to be approaching the vehicle 3 from behind. Thereby, by in view of unconventional driving criteria applicable for the road configuration 70 of the road 7 which the vehicle 3 has been established to be—or recently have been—positioned, assessing trajectories 61, 62 of surrounding vehicles 5 positioned essentially behind the vehicle 3, the behavioral analyzing system 1 may—should said respective trajectory 61, 62 and/or said trajectories 61, 62 in combination with one another fulfill one or more criteria out of said unconventional driving criteria—establish a presence of a rearward approaching emergency vehicle 2. That is, with the introduced concept, by behavioral analysis of the determined digital map driving paths 61, 62 of the surrounding vehicles 5 in comparison to unconventional driving criteria such as e.g. relating to crossing or nearly crossing of e.g. road markings—which may translate into one or more of the surrounding vehicles 5 maneuvering out of the way—a potential emergence from behind of an emergency vehicle 2, may be detected. The more surrounding vehicles 5 that are detected, and subsequently, the more surrounding vehicles trajectories 61, 62 that are being assessed, the more confidence in determining that an emergency vehicle 2 is deemed to be approaching the ego-vehicle 3 from behind, may be achieved.

In exemplifying FIG. 1, assuming in an exemplifying manner that a first unconventional driving criterion stipulates a surrounding vehicle trajectory 61, 62 crossing or nearly crossing road markings, and further that a second mandatory unconventional driving criterion stipulates a minimum of two trajectories 61, 62 crossing or nearly crossing road marking, then both the first unconventional driving criterion and the second unconventional driving criterion are fulfilled by the first 61 and the at least second surrounding vehicle trajectory 62, whereby an emergency vehicle 3 is deemed to be approaching the vehicle 3 from behind.

As indicated above, fulfillment of at least a portion of the unconventional driving criteria may refer to fulfillment of one criterion or fulfillment of a combination of different criterion, such as at least a stipulated number of—and/or combination of—different criterion out of said unconventional driving criteria, e.g. deemed relevant for the implementation and/or situation at hand. Moreover, the surrounding vehicle trajectories 61, 62 may be assessed in view of at least a portion of the unconventional driving criteria, one by one. Additionally or alternatively, said trajectories 61, 62 may be assessed in view of at least a portion of the unconventional driving criteria, in conjunction with one another 61, 62. For instance, a criterion may be set differently, e.g. with another threshold and/or level, should several trajectories 61, 62 be assessed in conjunction with one another.

The phrase "determining that an emergency vehicle is deemed to be approaching" may refer to "determining that an emergency vehicle is detected to be approaching" and/or "determining that an emergency vehicle is approaching", whereas "when [ . . . ] fulfill" may refer to "if [ . . . ] fulfill", "provided that [ . . . ] fulfill" and/or "should [ . . . ] fulfill". Moreover, the phrase "when said first and said at least second surrounding vehicle trajectory respectively and/or combined fulfill" may refer to "when at least a respective portion of said first and said at least second surrounding vehicle trajectory respectively and/or combined fulfill" and/or "when at least a respective predeterminable and/or selected portion of said first and said at least second surrounding vehicle trajectory respectively and/or combined fulfill". The phrase "respectively and/or combined", on the other hand, may refer to "respectively and/or in conjunction with one another", whereas "fulfill at least a portion of said driving criteria" may refer to "fulfill one or more criterion out of said unconventional driving criteria", "fulfill at least a predeterminable and/or selected portion of said driving criteria". Moreover, the phrase "respectively and/or combined fulfill at least a portion" may refer to "respectively and/or combined upon assessment, comparison, analysis and/or behavioral analysis are determined to fulfill".

Optionally, the behavioral analyzing system 1 may—e.g. by means of an optional acknowledgment communicating unit 105—be adapted and/or configured for, when an emergency vehicle 2 is deemed to be approaching the vehicle 3 from behind, communicating emergency vehicle acknowledgment data 8. Thereby, provided one or more emergency vehicle criterion is fulfilled, then an emergency vehicle acknowledgment 8 reflective thereof may be communicated from the behavioral analyzing system 1. Accordingly, the behavioral analyzing system 1 brings attention to when an emergency vehicle 2 is deemed to be approaching the vehicle 3 from behind. The phrase "communicating emergency vehicle acknowledgment data" may refer to "communicating digitally, electronically, wirelessly and/or by wire emergency vehicle acknowledgment data" and/or "communicating in due time and/or when deemed feasible and/or safe emergency vehicle acknowledgment data, whereas "emergency vehicle acknowledgment data" may refer to "one or more emergency vehicle acknowledgment signals" and/or "an emergency vehicle acknowledgment message".

The emergency vehicle acknowledgment data 8 may optionally be communicated to a control system 34 adapted to control an ADAS and/or AD system 31 of the vehicle 3, which emergency vehicle acknowledgment data 8 comprises an indication to initiate one or more evasive maneuvers and/or at least partly disable the ADAS and/or AD system 31. Thereby, instructions may be provided to the control system 34 prompting the ADAS and/or AD system 31 to initiate maneuvers to make way for the deemed rearward approaching emergency vehicle 2, and/or revoking the ADAS or AD system 31 to, at least temporarily, inhibit further activation(s). The control system 34 may refer to any commonly known system and/or functionality, e.g. comprised in one or more electronic control modules and/or nodes of the ego-vehicle 3, adapted and/or configured to at least in part control the ADAS and/or AD system 31. The phrase "control system" may refer to "on-board control system", "ADAS/AD control system" and/or "disablement system", whereas "control system adapted to control" may refer to "control system adapted to at least partly control". The phrase "comprising an indication to initiate", on the other hand, may refer to "prompting to initiate" and/or "comprising instructions prompting to initiate", whereas "indication to initiate one or more evasive maneuvers and/or at least partly disable an ADAS or AD system" may refer to "indication to in due time and/or when deemed feasible and/or safe initiate one or more evasive maneuvers and/or at least partly disable an ADAS or AD system". Moreover, "disable the ADAS or AD system" may refer to "inhibit and/or restrict functionality of" the ADAS or AD system".

Additionally or alternatively, emergency vehicle acknowledgment data 8 may optionally be communicated to a user interface 35 of the vehicle 3, which emergency vehicle acknowledgment data 8 comprises an indication to present to an occupant of the vehicle 3, one or more instructions relating to a rearward approaching emergency vehicle 2. Thereby, instructions may be provided to a user interface 35 of the vehicle 3 prompting an occupant of said vehicle 3, such as a driver thereof, to take appropriate action, such as e.g. maneuvering out of the way and/or take over driving of the vehicle 3 from a potential on-board ADAS or AD system 31. The phrase "user interface" may refer to "user interface controlling system", and according to an example further to "user interface comprising one or more of a display, speaker and tactile interface". Furthermore, the phrase "comprising an indication to present to an occupant of said vehicle, one or more instructions relating to a rearward approaching emergency vehicle" may refer to "prompting to present to an occupant of said vehicle, one or more instructions relating to a rearward approaching emergency vehicle" and/or "comprising instructions prompting to present to an occupant of said vehicle, one or more instructions relating to a rearward approaching emergency vehicle", whereas "indication to present to an occupant of said vehicle, one or more instructions relating to a rearward approaching emergency vehicle" may refer to "indication to in due time and/or when deemed feasible and/or safe present to an occupant of said vehicle, one or more instructions relating to a rearward approaching emergency vehicle". Moreover, the phrase "instructions relating to a rearward approaching emergency vehicle" may refer to "instructions pertinent that an emergency vehicle is deemed to be approaching from behind".

Additionally or alternatively, emergency vehicle acknowledgment data 8 may optionally be communicated to a nearby vehicle (not shown), which emergency vehicle acknowledgment data 8 comprises an indication relating to the deemed emergency vehicle 2. Thereby, information reflective of the deemed emergency vehicle 2 may be provided to another vehicle, such as e.g. a vehicle in vicinity of the ego-vehicle 3 and/or the deemed emergency vehicle 2. The vehicle acknowledgment data 8 may be communicated in any arbitrary—e.g. known—manner, such as e.g. from—and/or via—the previously discussed entity 4, and/or via vehicle-to-vehicle communication. Timing of transmittal may be arbitrarily selected as deemed feasible, such as e.g. promptly or at a point in time deemed suitable. The latter case may e.g. refer to awaiting a high bandwidth connection, such as e.g. a Wifi connection. The phrase "a nearby vehicle" may refer to "a vehicle other than said vehicle", "a vehicle other than the ego-vehicle" and/or "a vehicle within a predeterminable distance from—and/or driving in the same direction as—said vehicle and/or the deemed emergency vehicle". The phrase "comprising an indication relating to the deemed emergency vehicle", on the other hand, may refer to "comprising instructions relevant in view of the deemed emergency vehicle".

Optionally, the criterion fulfillment determining unit 104 is adapted for, when the first surrounding vehicle trajectory 61, the at least second surrounding vehicle trajectory 62 and at least one supplemental trajectory 91 of a supplemental surrounding vehicle 9 along the road section 71 obtained from a supplemental surrounding detecting vehicle determined to be—and/or have been—positioned along the road 7, respectively and/or combined fulfill at least a portion of the unconventional driving criteria, determining that an emergency vehicle 2 is deemed to be approaching the vehicle 3 from behind. Thereby, in addition to the first 61 and the at least second surrounding vehicle trajectory 62, at least one other trajectory 91 is assessed—isolated and/or in conjunction with the first 61 and the at least second surrounding vehicle trajectory 62—for determination of whether an emergency vehicle 2 is deemed to be approaching from behind. The at least one other trajectory 91 represents the driving path along at least a portion of the road section 71 of at least one vehicle 9 continuously and/or intermittently observed by a vehicle 10—other than the ego-vehicle 3—currently, or within a predeterminable time period such as e.g. within the past 1, 5 or 10 minutes, positioned along the road 7. Accordingly, by taking into consideration one or more further trajectories 91 of vehicles 9 tracked by one or more supplemental surrounding detecting vehicles 10 relatively near the ego-vehicle 3 in time and place, determination of whether an emergency vehicle 2 is deemed to be approaching may be established with even greater confidence. It may be noted that a road section 71 in view of the at least one trajectory 91 may differ from respective road sections 71 in view of the first 61 and the at least second surrounding vehicle trajectory 62, i.e. the respective road sections 71 for the different trajectories 61, 62, 91 may refer to slightly different—or merely partly overlapping—stretches of the road 7. Moreover, the one or more supplemental trajectories 91 of the one or more supplemental surrounding vehicles 9—and/or detection data of said supplemental surrounding vehicles 9 from which said trajectories 91 may be derived obtained by the supplemental surrounding detecting vehicle 10—may at least partly be assessed, processed, communicated and/or in any other arbitrary feasible manner handled in—or via—the off-board entity 4 discussed above, such as with support from an entity-based digital map 6. Additionally or alternatively, the behavioral analyzing system 1 may obtain—and/or may have obtained—said one or more supplemental trajectories 91 via vehicle-to-vehicle communication with e.g. the supplemental surrounding detecting vehicle 10.

Optionally, the criterion determining unit 102 may be adapted for determining unconventional driving criteria in view of the road configuration 70 and further in view of one or more detected and/or reported anomalies along the road section 71. Thereby, when dictating what should be considered unconventional driving in view of the road configuration 70, consideration may be given to exceptions from said road configuration 70, such as e.g. one or more obstacles, temporary road work, accidents etc. along the road 7. The one or more anomalies may be—and/or have been—detected and/or reported in any arbitrary—e.g. known—feasible manner, such as e.g. detected by the ego-vehicle 3 itself e.g. with support from one or more of the surrounding detecting sensors 33, e.g. communicated from the entity 4 discussed above, and/or obtained via vehicle-to-vehicle communication. Moreover, the one or more detected and/or reported anomalies may be—and/or may have been—detected by observing, e.g. in said entity 4 with support from an off-board digital map 6, trajectories of plural vehicles driving along the road 7, continuously and/or intermittently determining their positions, from which respective trajectories along said road 7 may be derived. From plural vehicles' trajectories, potential anomalies along the road section 71 may be identified. The phrase "detected and/or reported anomalies" may refer to "known anomalies", "detected and/or reported anomalies affecting accessibility on said road" and/or "detected and/or reported irregularities and/or obstacles", whereas "detected and/or reported anomalies along said road section" according to an example may refer to "detected and/or reported anomalies along said road section obtained from said vehicle and/or from another vehicle determined to be—and/or have been—positioned along said road".

Optionally, the unconventional driving criteria in view of the road configuration 70, may comprise trajectories—such as e.g. the first 61, the at least second surrounding vehicle trajectory 62 and/or the at least one supplemental trajectory 91—respectively and/or combined crossing and/or nearing road and/or lane markings of the road configuration 70, to a predeterminable extent. Additionally or alternatively, the unconventional driving criteria in view of the road configuration 70, may comprise trajectories—such as e.g. the first 61, the at least second surrounding vehicle trajectory 62 and/or the at least one supplemental trajectory 91—respectively and/or combined deviating from one or more reference trajectories 60 pertinent the road configuration 70, to a predeterminable extent. The reference trajectories 60 may refer to any arbitrary number of potential trajectories deemed to represent conventional driving along the road 7, and may accordingly refer to numerous possible trajectories. The phrase "reference trajectories" may refer to "conventional driving trajectories" and/or "nominal trajectories", whereas "crossing and/or nearing road and/or lane markings" may refer to "at least partly crossing and/or coming within a predeterminable distance from said road and/or lane markings" and/or "crossing and/or nearing road and/or lane markings, roadsides and/or shoulders". The phrase "reference trajectories pertinent the road configuration", on the other hand, may refer to "reference trajectories relevant and/or deemed suitable for the road configuration".

Optionally, at least one of the one or more reference trajectories 60 may at least partly be based on an ego-vehicle trajectory 3211 along the road section 71 derived from the obtained ego-vehicle positions 321. Additionally or alternatively, at least one of the one or more reference trajectories 60 may at least partly be based on a—from a secondary vehicle 11 obtained—secondary trajectory 111 along the road section 71 derived from vehicle positions of the secondary vehicle 11. Thereby, dynamic input in the form of recent and/or historical driving along the road 7, may form basis for one or more of the reference trajectories 60. The secondary trajectory 111 of the secondary vehicle 11—and/or positioning and/or localization data of said secondary vehicle 11 from which said trajectory 111 may be derived—may at least partly be assessed, processed, communicated and/or in any other arbitrary feasible manner handled in—or via—the off-board entity 4 discussed above, such as with support from an entity-based digital map 6. Additionally or alternatively, the behavioral analyzing system 1 may obtain—and/or may have obtained—said secondary trajectory 111 via vehicle-to-vehicle communication with e.g. the secondary vehicle 11. The phrase "ego-vehicle trajectory" may refer to "ego-vehicle driving path, trail and/or snail trail". "Secondary vehicle", on the other hand, may refer to "vehicle other than the ego-vehicle", and/or "secondary vehicle having on-board localization sensors adapted to continuously and/or intermittently detect ego-vehicle positions", whereas "secondary trajectory" may refer to "trajectory of said secondary vehicle" and/or "pre-stored secondary trajectory". Moreover, the phrase "derived from vehicle positions of said secondary vehicle" may refer to "derived from vehicle positions of said vehicle obtained with support from on-board localization sensors" and/or "derived from vehicle positions of said secondary vehicle, which secondary vehicle is determined to be—and/or have been—positioned along said road".

As further shown in FIG. 2, which is a schematic block diagram illustrating an exemplifying behavioral analyzing system 1 according to embodiments of the disclosure, the behavioral analyzing system 1 comprises a road configuration deriving unit 101, a criterion determining unit 102, a trajectory determining unit 103, a criterion fulfillment determining unit 104 and an optional acknowledgment communicating unit 105, all of which already have been described in greater detail above. Furthermore, the embodiments herein for detection of an emergency vehicle 2 approaching a vehicle 3 from behind, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the behavioral analyzing system 1. One such carrier may be in the form of a CD ROM disc and/or a hard drive, it is however feasible with other data carriers. The computer program code may furthermore be provided as pure program code on a server and downloaded to the behavioral analyzing system 1. The behavioral analyzing system 1 may further comprise a memory 107 comprising one or more memory units. The memory 107 may be arranged to be used to store e.g. information, and further to store data, configurations, scheduling, and applications, to perform the methods herein when being executed in the behavioral analyzing system 1. For instance, the computer program code may be implemented in the firmware, stored in FLASH memory 107, of an embedded processor 106, and/or downloaded wirelessly e.g. from an off-board server. Furthermore, the road configuration deriving unit 101, the criterion determining unit 102, the trajectory determining unit 103, the criterion fulfillment determining unit 104, the optional acknowledgment communicating unit 105, the optional processor 106 and/or the optional memory 107, may at least partly be comprised in one or more nodes e.g. ECUs of the vehicle 3, and/or at least partly in an off-board entity such as the entity 4 discussed above, e.g. an automotive cloud. Those skilled in the art will also appreciate that said units 101, 102, 103, 104, 105 described above may refer to a combination of analog and digital circuits, and/or one or more processors configured with software and/or firmware, e.g. stored in a memory such as the memory 107, that when executed by the one or more processors such as the processor 106 perform as described herein, such as in conjunction with FIG. 3. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Further shown in FIG. 2 is the exemplifying vehicle 3, comprising the ADAS and/or AD system 31, the one or more localization sensors 32, the one or more surrounding detecting sensors 33, the control system 34 and the user interface 35. Also illustrated in FIG. 2 is the exemplifying off-board entity 4, the digital map 6, the supplemental vehicle 10 and the secondary vehicle 11, all of which have been discussed in greater detail above.

Figure 3:
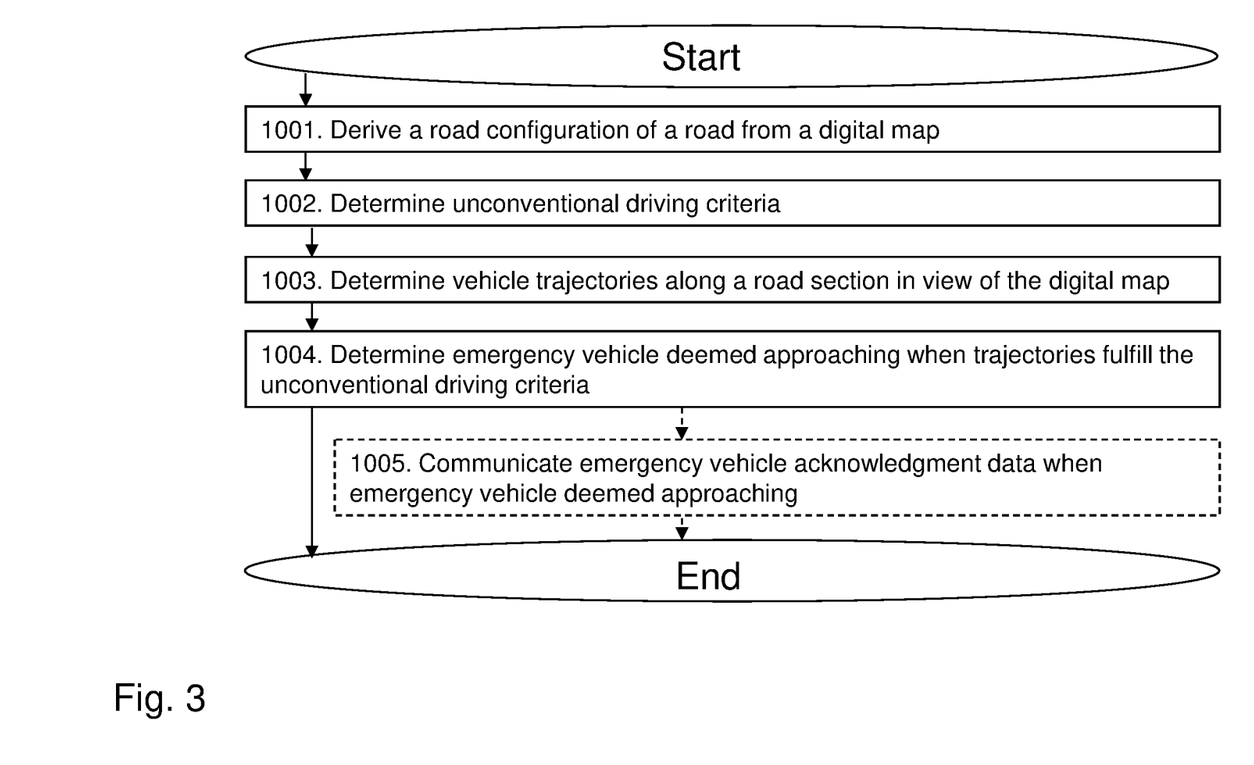
FIG. 3 is a flowchart depicting an exemplifying method performed by a behavioral analyzing system according to embodiments of the disclosure.

FIG. 3 is a flowchart depicting an exemplifying method performed by a behavioral analyzing system 1 according to embodiments of the disclosure. Said method is for detection of an emergency vehicle 2 approaching a vehicle 3 from behind. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Action 1003 may be performed prior to—and/or a simultaneously with—Actions 1001 and Actions 1002.

Action 1001

In Action 1001, the behavioral analyzing system 1 derives from a digital map 6—e.g. with support from the road configuration deriving unit 101—a road configuration 70 of a road 7 along which the vehicle 3, based on ego-vehicle positions 321 obtained with support from localization sensors 32 on-board the vehicle 3, is determined to be—and/or have been—positioned.

Action 1002

In Action 1002, the behavioral analyzing system 1 determines—e.g. with support from the criterion determining unit 102—unconventional driving criteria in view of the road configuration 70.

Optionally, the unconventional driving criteria in view of the road configuration 70 may comprise trajectories respectively and/or combined crossing and/or nearing road and/or lane markings of the road configuration 70 and/or deviating from one or more reference trajectories 60 pertinent the road configuration 70, to a predeterminable extent.

Moreover, optionally, at least one of the one or more reference trajectories 60 may at least partly be based on an ego-vehicle trajectory 3211 along the road section 71 derived from the obtained ego-vehicle positions 321, and/or on a—from a secondary vehicle 11 obtained—secondary trajectory 111 along the road section 71 derived from vehicle positions of the secondary vehicle 11.

Optionally, Action 1002 of determining unconventional driving criteria may comprise determining unconventional driving criteria in view of the road configuration 70 and further in view of one or more detected and/or reported anomalies along the road section 71.

Action 1003

In Action 1003, the behavioral analyzing system 1 determines—e.g. with support from the trajectory determining unit 103—based on surrounding vehicle detection data of a first 51 and at least a second surrounding vehicle 52, obtained with support from surrounding detecting sensors 33 on-board the vehicle 3, derived continuously and/or intermittently along at least a road section 71 of the road 7, a respective first 61 and at least a second surrounding vehicle trajectory 62 along at least the road section 71 in view of the digital map 6.

Action 1004

In Action 1004, the behavioral analyzing system 1 determines—e.g. with support from the criterion fulfillment determining unit 104—when the first 61 and the at least second surrounding vehicle trajectory 62 respectively and/or combined fulfill at least a portion of the unconventional driving criteria, that an emergency vehicle 2 is deemed to be approaching the vehicle 2 from behind.

Optionally, Action 1004 of determining that an emergency vehicle 2 is deemed to be approaching the vehicle 3 from behind may comprise, when the first surrounding vehicle trajectory 61, the at least second surrounding vehicle trajectory 62 and at least one supplemental trajectory 91 of a supplemental surrounding vehicle 9 along the road section 71 obtained from a supplemental surrounding detecting vehicle 10 determined to be—and/or have been—positioned along the road 7, respectively and/or combined fulfill at least a portion of the unconventional driving criteria, determining that an emergency vehicle 2 is deemed to be approaching the vehicle 2 from behind.

Action 1005

In optional Action 1005, the behavioral analyzing system 1 may—e.g. with support from the optional acknowledgment communicating unit 105—when an emergency vehicle 3 is deemed to be approaching the vehicle 2 from behind, communicate emergency vehicle acknowledgment data 8.

Emergency vehicle acknowledgment data 8 may optionally be communicated to a control system 34 adapted to control an ADAS or AD system 31 of the vehicle 3, which emergency vehicle acknowledgment data 8 comprises an indication to initiate one or more evasive maneuvers and/or at least partly disable the ADAS or AD system 31.

Additionally or alternatively, emergency vehicle acknowledgment data 8 may optionally be communicated to a user interface 35 of the vehicle 3, which emergency vehicle acknowledgment data 8 comprises an indication to present to an occupant of the vehicle 3, one or more instructions relating to a rearward approaching emergency vehicle 2.

Furthermore, additionally or alternatively, emergency vehicle acknowledgment data 8 may optionally be communicated to a nearby vehicle, which emergency vehicle acknowledgment data 8 comprises an indication relating to the deemed emergency vehicle 2.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a behavioral analyzing system for detection of an emergency vehicle approaching a vehicle from behind, the method comprising:
   deriving from a digital map a road configuration of a road along which the vehicle, based on ego-vehicle positions obtained with support from localization sensors on-board the vehicle, is at least one of determined to be and has been positioned;
   determining unconventional driving criteria in view of the road configuration;
   determining based on surrounding vehicle detection data of a first and at least a second surrounding vehicle, obtained with support from surrounding detecting sensors on-board the vehicle, derived at least one of continuously and intermittently along at least a road section of the road, a respective first and at least a second surrounding vehicle trajectory along at least the road section in view of the digital map; and
   determining, when the first and the at least second surrounding vehicle trajectory at least one of respectively and combined fulfill at least a portion of the unconventional driving criteria, that an emergency vehicle is deemed to be approaching the vehicle from behind.

2. The method according to claim 1, further comprising:
communicating, when an emergency vehicle is deemed to be approaching the vehicle from behind, emergency vehicle acknowledgment data, to at least one of:
one of a control system configured to control an advanced driver-assistance system, ADAS, and an automated driving, AD, system of the vehicle, the emergency vehicle acknowledgment data comprising an indication to at least one of initiate one or more evasive maneuvers and at least partly disable the ADAS or AD system; and/or
a user interface of the vehicle, the emergency vehicle acknowledgment data comprising an indication to present to an occupant of the vehicle, one or more instructions relating to a rearward approaching emergency vehicle; and
to a nearby vehicle, the emergency vehicle acknowledgment data comprising an indication relating to the deemed emergency vehicle.

3. The method according to claim 2, wherein the determining that an emergency vehicle is deemed to be approaching the vehicle from behind comprises determining, when the first surrounding vehicle trajectory, the at least second surrounding vehicle trajectory and at least one supplemental trajectory of a supplemental surrounding vehicle along the road section obtained from a supplemental surrounding detecting vehicle at least one of determined to be and has been positioned along the road, at least one of respectively and combined fulfill at least a portion of the unconventional driving criteria, that an emergency vehicle is deemed to be approaching the vehicle from behind.

4. The method according to claim 3, wherein the determining unconventional driving criteria comprises determining unconventional driving criteria in view of the road configuration and further in view of one or more of at least one of detected and reported anomalies along the road.

5. The method according to claim 2, wherein the determining unconventional driving criteria comprises determining unconventional driving criteria in view of the road configuration and further in view of one or more of at least one of detected and reported anomalies along the road.

6. The method according to claim 5, wherein the unconventional driving criteria in view of the road configuration comprises at least one of:
at least one of trajectories respectively and combined crossing;
at least one of nearing road and lane markings of the road configuration; and
deviating from one or more reference trajectories pertinent the road configuration, to a predeterminable extent.

7. The method according to claim 2, wherein the unconventional driving criteria in view of the road configuration comprises at least one of:
at least one of trajectories respectively and combined crossing;
at least one of nearing road and lane markings of the road configuration; and
deviating from one or more reference trajectories pertinent the road configuration, to a predeterminable extent.

8. The method according to claim 1, wherein the determining that an emergency vehicle is deemed to be approaching the vehicle from behind comprises determining, when the first surrounding vehicle trajectory, the at least second surrounding vehicle trajectory and at least one supplemental trajectory of a supplemental surrounding vehicle along the road section obtained from a supplemental surrounding detecting vehicle at least one of determined to be and has been positioned along the road, at least one of respectively and combined fulfill at least a portion of the unconventional driving criteria, that an emergency vehicle is deemed to be approaching the vehicle from behind.

9. The method according to claim 1, wherein the determining unconventional driving criteria comprises determining unconventional driving criteria in view of the road configuration and further in view of one or more of at least one of detected and reported anomalies along the road.

10. The method according to claim 1, wherein the unconventional driving criteria in view of the road configuration comprises at least one of:
at least one of trajectories respectively and combined crossing;
at least one of nearing road and lane markings of the road configuration; and
deviating from one or more reference trajectories pertinent the road configuration, to a predeterminable extent.

11. The method according to claim 10, wherein at least one of the one or more reference trajectories at least partly is based on an ego-vehicle trajectory along the road section derived from at least one of the obtained ego-vehicle positions and a secondary vehicle obtained secondary trajectory along the road section derived from vehicle positions of the secondary vehicle.

12. A behavioral analyzing system for detection of an emergency vehicle approaching a vehicle from behind, the system comprising:
a road configuration deriving unit configured to derive from a digital map a road configuration of a road along which the vehicle, based on ego-vehicle positions obtained with support from localization sensors on-board the vehicle, is at least one of determined to be and has been positioned;
a criterion determining unit configured to determine unconventional driving criteria in view of the road configuration;
a trajectory determining unit configured to determine based on surrounding vehicle detection data of a first and at least a second surrounding vehicle, obtained with support from surrounding detecting sensors on-board the vehicle, derived at least one of continuously and intermittently along at least a road section of the road, a respective first and at least a second surrounding vehicle trajectory along at least the road section in view of the digital map; and
a criterion fulfillment determining unit configured to determine, when the first and the at least second surrounding vehicle trajectory at least one of respectively and combined fulfill at least a portion of the unconventional driving criteria, that an emergency vehicle is deemed to be approaching the vehicle from behind.

13. The behavioral analyzing system according to claim 12, further comprising:
an acknowledgment communicating unit configured to communicate, when an emergency vehicle is deemed to be approaching the vehicle from behind, emergency vehicle acknowledgment data, to at least one of:
one of a control system configured to control an advanced driver-assistance system, ADAS, and an automated driving, AD, system of the vehicle, the emergency vehicle acknowledgment data comprising an indication to at least one of initiate one or more evasive maneuvers and at least partly disable the ADAS or AD system; and/or a user interface of the vehicle, the emergency vehicle acknowledgment data comprising an indication to present to an occupant of the vehicle, one or more instructions relating to a rearward approaching emergency vehicle; and to a nearby vehicle, the emergency vehicle acknowledgment data comprising an indication relating to the deemed emergency vehicle.

14. The behavioral analyzing system according to claim 13, wherein the criterion fulfillment determining unit is adapted for determining, when the first surrounding vehicle trajectory, the at least second surrounding vehicle trajectory and at least one supplemental trajectory of a supplemental surrounding vehicle along the road section obtained from a supplemental surrounding detecting vehicle determined to be—and/or have been—positioned along the road, respectively and/or combined fulfill at least a portion of the unconventional driving criteria, that an emergency vehicle is deemed to be approaching the vehicle from behind.

15. The behavioral analyzing system according to claim 12, wherein the criterion fulfillment determining unit is adapted for determining, when the first surrounding vehicle trajectory, the at least second surrounding vehicle trajectory and at least one supplemental trajectory of a supplemental surrounding vehicle along the road section obtained from a supplemental surrounding detecting vehicle determined to be—and/or have been—positioned along the road, respectively and/or combined fulfill at least a portion of the unconventional driving criteria, that an emergency vehicle is deemed to be approaching the vehicle from behind.

16. The behavioral analyzing system according to claim 12, wherein the criterion determining unit is configured to determine unconventional driving criteria comprises determining unconventional driving criteria in view of the road configuration and further in view of one or more of at least one of detected and reported anomalies along the road.

17. The behavioral analyzing system according to claim 12, wherein the unconventional driving criteria in view of the road configuration comprises at least one of:

at least one of trajectories respectively and combined crossing;

at least one of nearing road and lane markings of the road configuration; and deviating from one or more reference trajectories pertinent the road configuration, to a predeterminable extent.

18. The behavioral analyzing system according to claim 17, wherein at least one of the one or more reference trajectories at least partly is based on an ego-vehicle trajectory along the road section derived from at least one of the obtained ego-vehicle positions and a secondary vehicle obtained secondary trajectory along the road section derived from vehicle positions of the secondary vehicle.

19. The behavioral analyzing system according to claim 12, wherein the behavioral analyzing system is part of at least one of a vehicle and an off-board entity.

20. A non-volatile computer readable storage medium having stored thereon a computer program which, when executed, performs a method for detection of an emergency vehicle approaching a vehicle from behind, the method comprising:

deriving from a digital map a road configuration of a road along which the vehicle, based on ego-vehicle positions obtained with support from localization sensors on-board the vehicle, is at least one of determined to be and has been positioned;

determining unconventional driving criteria in view of the road configuration;

determining based on surrounding vehicle detection data of a first and at least a second surrounding vehicle, obtained with support from surrounding detecting sensors on-board the vehicle, derived at least one of continuously and intermittently along at least a road section of the road, a respective first and at least a second surrounding vehicle trajectory along at least the road section in view of the digital map; and determining, when the first and the at least second surrounding vehicle trajectory at least one of respectively and combined fulfill at least a portion of the unconventional driving criteria, that an emergency vehicle is deemed to be approaching the vehicle from behind.

* * * * *